(12) United States Patent
Scavezze et al.

(10) Patent No.: US 9,443,414 B2
(45) Date of Patent: Sep. 13, 2016

(54) OBJECT TRACKING

(75) Inventors: Mike Scavezze, Bellevue, WA (US);
Jason Scott, Kirkland, WA (US);
Jonathan Steed, Redmond, WA (US);
Ian McIntyre, Redmond, WA (US);
Aaron Krauss, Snoqualmie, WA (US);
Daniel McCulloch, Kirkland, WA (US);
Stephen Latta, Seattle, WA (US)

(73) Assignee: MICROSOFT TECHNOLOGY LICENSING, LLC, Redmond, WA (US)

(\*) Notice: Subject to any disclaimer, the term of this patent is extended or adjusted under 35 U.S.C. 154(b) by 443 days.

(21) Appl. No.: 13/569,003

(22) Filed: Aug. 7, 2012

(65) Prior Publication Data

US 2014/0044305 A1 Feb. 13, 2014

(51) Int. Cl.
*G06K 9/00* (2006.01)
*G08B 21/24* (2006.01)
*G08B 13/196* (2006.01)

(52) U.S. Cl.
CPC .......... *G08B 21/24* (2013.01); *G06K 9/00771* (2013.01); *G08B 13/19613* (2013.01)

(58) Field of Classification Search
None
See application file for complete search history.

(56) References Cited

U.S. PATENT DOCUMENTS

| | | | |
|---|---|---|---|
| 6,295,367 B1 | 9/2001 | Crabtree et al. | |
| 6,377,296 B1 | 4/2002 | Zlatsin et al. | |
| 7,231,064 B2* | 6/2007 | Rui et al. | 382/103 |
| 7,775,661 B2 | 8/2010 | Zuccolotto et al. | |
| 8,027,029 B2 | 9/2011 | Lu et al. | |
| 8,144,931 B1* | 3/2012 | Hartman et al. | 382/103 |
| 2007/0092110 A1 | 4/2007 | Xu et al. | |
| 2008/0309874 A1 | 12/2008 | Zuccolotto et al. | |
| 2009/0111484 A1 | 4/2009 | Koch et al. | |
| 2009/0123090 A1* | 5/2009 | Li et al. | 382/305 |
| 2011/0222729 A1 | 9/2011 | Gabara | |
| 2012/0133774 A1* | 5/2012 | Sarhan | 348/159 |
| 2012/0169882 A1 | 7/2012 | Millar et al. | |
| 2012/0314900 A1* | 12/2012 | Tyomkin et al. | 382/103 |
| 2013/0022232 A1* | 1/2013 | Jacob | G06K 9/00 382/103 |

FOREIGN PATENT DOCUMENTS

WO 2009/111498 A2 9/2009

OTHER PUBLICATIONS

Shi, et al., "The Research and Implementation of Moving Object Detecting and Tracking in Intelligence Video Monitor System", Retrieved at <<http://ieeexplore.ieee.org/stamp/stamp.jsp?tp=&arnumber=5957478>>, Proceedings of International Conference on Multimedia and Signal Processing 2011 (CMSP), May 14, 2011, pp. 10-11.

(Continued)

*Primary Examiner* — Weiwen Yang
(74) *Attorney, Agent, or Firm* — Dan Choi; Micky Minhas (57) ABSTRACT

Embodiments are disclosed herein that relate to the automatic tracking of objects. For example, one disclosed embodiment provides a method of operating a mobile computing device having an image sensor. The method includes acquiring image data, identifying an inanimate moveable object in the image data, determining whether the inanimate moveable object is a tracked object, if the inanimate moveable object is a tracked object, then storing information regarding a state of the inanimate moveable object, detecting a trigger to provide a notification of the state of the inanimate moveable object, and providing an output of the notification of the state of the inanimate moveable object.

16 Claims, 4 Drawing Sheets

(56) References Cited

OTHER PUBLICATIONS

Nasrulla, et al., "A Novel Algorithm for Real Time Moving Object Tracking" Retrieved at <<http://ieeexplore.ieee.org/stamp/stamp.jsp?tp=&arnumber=6108845>>, Proceedings of International Conference on Image Information Processing (ICIIP), 2011, Nov. 3, 2011, pp. 1-5.
Wang, et al., "A Multiple Object Tracking Method using Kalman Filter", Retrieved at <<http://ieeexplore.ieee.org/stamp/stamp.jsp?tp=&arnumber=5512258>>, Proceedings of IEEE International Conference on Information and Automation (ICIA), 2010, Jun. 20, 2010, pp. 1862-1866.
Fox, et al., "Classifying the User's Behavior", Retrieved at <<http://ieeexplore.ieee.org/stamp/stamp.jsp?tp=&arnumber=4669775>>, Proceedings of 20th IEEE International Conference on Tools with Artificial Intelligence, 2008 (ICTAI '08), Nov. 3, 2008, pp. 202-205.
Li, et al., "Combining Motion Segmentation and Feature based Tracking for Object Classification and Anomaly Detection", Retrieved at <<http://ieeexplore.ieee.org/stamp/stamp.jsp?tp=&arnumber=4454256>>, Proceedings of 4th European Conference on Visual Media Production, 2007 (IETCVMP), Nov. 27, 2007, p. 1.
Borriello, et al., "Reminding about Tagged Objects using Passive RFIDs" Retrieved at <<http://www.washington.edu/news/archive/relatedcontent/2004/October/rc_parentID5748_thisID5749.pdf>>, Proceedings of Ubicomp, 2004, Retrieved Date : Mar. 15, 2012, pp. 36-53.
Zoidi, et al., "Object Tracking based on Local Steering Kernels for Drinking Activity Recognition", Retrieved at <<http://ieeexplore.ieee.org/stamp/stamp.jsp?tp=&arnumber=5974028>>, Proceedings of 33rd International Conference on Information Technology Interfaces (ITI), (ITI 2011), Jun. 27, 2011, pp. 237-242.
Frank, et al., "A Service Architecture for Monitoring Physical Objects using Mobile Phones", Retrieved at <<http://vs.inf.ethz.ch/publ/papers/chfrank.aswn.2007.pdf>>, Proceedings of 7th International Workshop on Applications and Services in Wireless Networks (ASWN 2007) Santander, Spain, May 2007, pp. 1-8.
Watfa, et al., "An Intelligent RFID System", Retrieved at <<http://www.alphagalileo.org/AssetViewer.aspx?AssetId=62415&CultureCode=en>>, Proceedings of International Journal of Intelligent Systems Technologies and Applications, Retrieved Date : Mar. 15, 2012, pp. 377-395.
European Patent Office, Extended European Search Report Issued in European Patent Application No. 13198231.6, May 14, 2014, 5 Pages.
ISA US Patent and Trademark Office, International Search Report & Written Opinion for PCT/US2013/053633, WIPO, Aug. 20, 2014, 8 Pages.
The State Intellectual Property Office of China, First Office Action and Search Report issued in Chinese Patent Application No. 201310757227.6, Jun. 20, 2016, China, 12 pages.

* cited by examiner

OBJECT TRACKING

BACKGROUND

The tracking of the location or other stale of objects may occupy a significant amount of effort in everyday life. Further, much time may be spent in trying to locate misplaced objects. For example, searching for misplaced car keys, wallets, mobile devices, and the like may cause people to lose productive time. Likewise, forgetting that the milk carton in the home refrigerator is almost empty may lead to an extra trip to the store that could have been avoided had the shopper remembered the state of the milk carton. In some instances, such objects may be moved, emptied, etc. by a person other than the owner, thereby complicating the task of tracking.

SUMMARY

Accordingly, various embodiments are disclosed herein that relate to the automatic tracking of objects. For example, one disclosed embodiment provides a method of operating a mobile computing device that comprises an image sensor. The method includes acquiring image data, identifying an inanimate moveable object in the image data, determining whether the inanimate moveable object is a tracked object, and if the inanimate moveable object is a tracked object, then storing information regarding a state of the inanimate moveable object. The method further comprises detecting a trigger to provide a notification of the state of the inanimate moveable object, and providing an output of the notification of the state of the inanimate moveable object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any all disadvantages noted in any part of this disclosure.

DETAILED DESCRIPTION

As mentioned above, tracking and remembering the states (e.g. location or other physical state) of objects may take significant time in effort during everyday life. Further, failure to accurately track the slates of objects may lead to lost time and productivity. Therefore, embodiments are disclosed herein that relate to automatically tracking the states of objects. Briefly, a mobile device, such as a see-through display worn by a user, may comprise image sensors that observe the user's environment. Video data from the image sensors may be processed to detect objects in the user's environment, and to identify tracked objects in the video data. State information, such as location and other characteristics, of tracked objects may then be stored. This ma allow for the output of an alert regarding the state of a tracked object upon detection of an alert trigger, such as a user request or a contextual clue. The state information may be stored locally, and/or uploaded to a remote service. Where multiple people utilize object-tracking devices as disclosed herein, each person may become aware of changes to objects made by other users via the sharing of object tracking information. In this manner, a user may be able to discover a most recent location of lost keys, may be provided with a reminder to buy more milk while browsing the daily section at a grocery store, and/or may track and recall other object state information in any suitable manner.

Figure 1A:
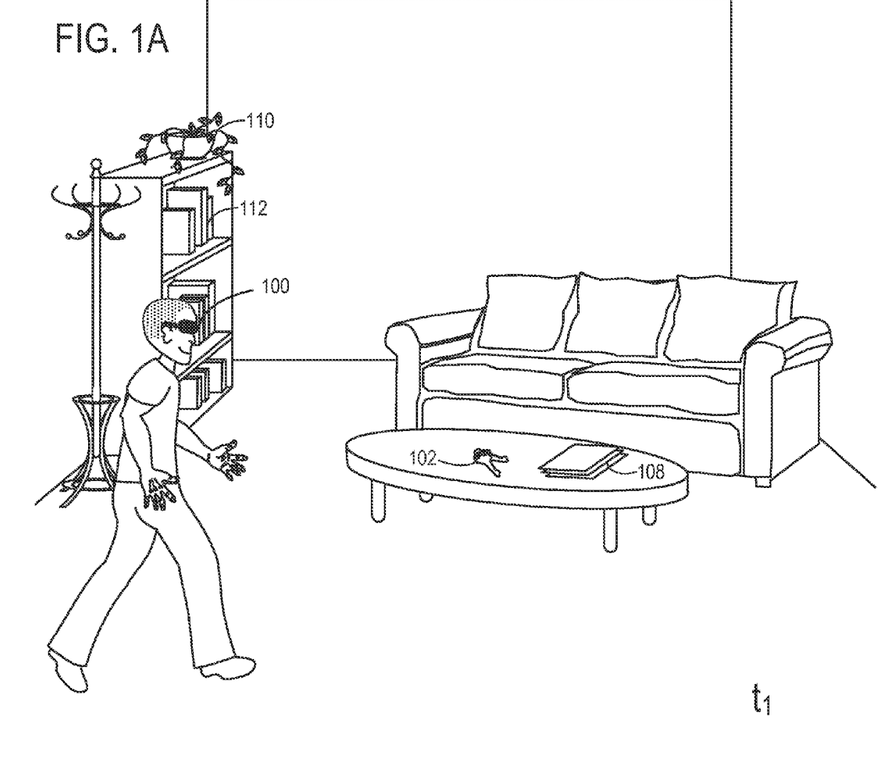
FIG. 1A depicts a user of an embodiment of a see-through display device viewing a use environment through the see-through display device.
Figure 1B:
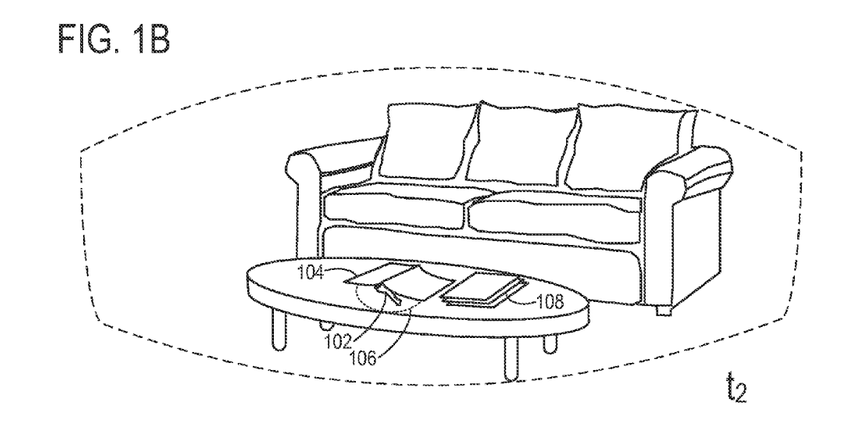
FIG. 1B shows a perspective of the user of FIG. 1A, and also shows an embodiment of a tracked object alert displayed on the see-through display device.

FIGS. 1A and 1B illustrate a non-limiting example use scenario. First, FIG. 1A illustrates a user wearing a head-mounted see-through display device 100 in the form of a pair of glasses, and observing an environment (a living room) through the see-through display device 100 at a first time $t_i$. As described in more detail below, the see-through display device 100 comprises one or more outwardly facing image sensors (RGB and/or depth sensors) that acquire video imagery as the user moves about. The acquired video imagery may be analyzed, in real time or at a later time, to identify moveable inanimate objects that are tracked by the user, as described in more detail below, in FIG. 1A, an example embodiment of a tracked moveable inanimate object is illustrated as keys 102 that are located on a table under a pile of magazines, but it will be understood that any suitable object may be tracked.

The identified object data and/or image data may be stored to provide future information, such as alerts, to the user regarding the objects. For example, referring to FIG. 1B, at a later time $t_2$, the keys 102 have been covered by a newspaper 104. Thus, in response to a user input requesting information about the location of the keys (e.g. a voice command detected via a microphone on the see-through display device 100), the keys are highlighted 106 on the see-through display device 100.

It will be understood that the see-through display device 100 may not track state information for all objects that a user observes or even interacts with. For example, in FIG. 1A, the environment observed by the user includes various other moveable inanimate objects than keys 102, such as magazines 108, a flower pot 110, and books 112 on a bookshelf, that the user may not wish to track.

As such, the see-through display device 100 may track the state of objects that are considered sufficiently "important," wherein the term "important" signifies whether sufficient implicit and/or explicit information has been received to designate the object as tracked. Thus, before storing any information regarding the observed state of an inanimate moveable object, the see-through display device 100 may determine whether the object is a tracked object, and then store the state information if the object is a tracked object. The see-through display device 100 also may detect information that changes an "importance score" assigned to objects. As described in more detail below, such an importance score may be compared to one or more threshold importance scores to determine whether to track object state information and/or what object state information to track.

An inanimate moveable object may be defined as tracked in any suitable manner. For example, the status of the object as tracked may be pre-defined (e.g. by a developer), may be user-defined, and/or may be adaptively learned. In embodiments in which some objects are pre-defined as tracked, the pre-definition may be applied to a set of objects considered to be important to most users, such as keys, wallets, financial transaction cards, and the like. Further, users may have the ability to remove an object that matches a pre-defined important object definition from the tracked object list, should tracking not be desired for that object.

An object may be designated as tracked in any suitable manner. For example, the see-through display device 100 may include an object designation mode in which the user holds or otherwise places an object within a field of view of an image sensor on the see-through display device 100, scans an image of the object, and identifies it as tracked. As a more specific example, a user wearing the see-through display device 100 may use a voice command such as "track this object" while holding an inanimate moveable object (e.g. keys, wallet, credit/debit cards, etc.) in front of the see-through display device 100, thereby triggering the see-through display device to store the object as a tracked object.

Further, in some embodiments, a user may be able to place tune and/or location constraints on a tracked object designation. For example, a user who is traveling abroad may designate a passport as a tracked object for a specified date range or until returning to a specified location (e.g. home), such that the tracking will automatically end when the specified date, location, or other condition is met. Additionally, a user may have the option of changing a status of an inanimate moveable object from tracked to untracked at anytime. It will be understood that these methods for the user designation of tracked objects are presented for the purpose of example, and that a user may define a tracked object in any suitable manner.

As mentioned above, in some embodiments the see-through display device 100 may adaptively learn which objects to track. This may help a person locate objects that have not been explicitly defined as tracked objects, yet are of potential importance to the person. The see-through display device 100 may adaptively designate an inanimate moveable object as a tracked object based upon any suitable criteria. For example, the see-through display device 100 may designate an inanimate moveable object as a tracked object based upon a number, pattern, and/or frequency of sightings of and/or user interactions with the object, such that objects that are seen and/or interacted with more often are more likely to be considered important.

Further, the see-through display device 100 may recognize specific locations (e.g. home, office, and other locations), times, and/or situations (e.g. getting ready to go to work), and determine whether to designate an inanimate moveable object as a tracked object based upon a location and/or situation in which the user interacts with the object or in which the object is otherwise seen. For example, objects located at a user's home bookshelf may be more likely to be objects of importance than objects located on a store shelf. As another example, objects that are placed down in close proximity to tracked objects may be more likely to be important than other objects. For example, a user may place keys, wallet, and mobile device down on a table together as a group. As yet another example, an object that is moved by another person may he considered to he potentially important.

Further, in some embodiments, a user may be able to designate a location and/or a time as a designated important location and/or time. In this manner, objects that the user interacts with in the designated location and/or time may be more likely to be important than in times and/or locations that are not designated as important. As an example, a user may designate a travel document carrier as an important object for the duration of a vacation. Similarly, objects that a user carries from home to another location may be more likely to be objects of importance than objects originating from the other location. For example, at a restaurant, it may be more desirable to track an object that a user removes from a coat pocket and places on a table than the user's water glass.

As yet another example, objects that a user interacts with at certain times of the day (e.g. in the morning before going to work) may be more likely to be objects of importance than objects with which the user interacts at other times. Further, objects with which a user interacts in temporal proximity to a change of user context (e.g. before leaving home to go to work) may be likely to be important, as a user may interact with keys, wallet, a briefcase, smart phone, and the like before leaving home or the office. Objects with which the user interacts at the end of variable length events (e.g. time spent searching for keys each morning before finding the keys and/or exiting the house) also may be considered more likely to be important.

An inanimate moveable object may be adaptively designated as tracked in any suitable manner. For example, as mentioned above, an importance score may be assigned to detected and identified objects in video image data based upon locational, temporal, behavioral, and/or other factors relating to the interaction of a user of the see-through display device with the objects. If the importance score meets or exceeds a threshold importance score, then the object may be designated as tracked, and more detailed information regarding the state of the object (e.g. most recent location, historical locations, value of a variable physical property of the object etc.) may be stored. Further, in some embodiments, different threshold importance scores may be used to define different levels of importance. This may allow different types of information to be stored, different types of alerts to be provided, etc. for an object based upon different levels of importance.

Patterns of user interactions with objects may be tracked in any suitable manner. For example, user behaviors may be classified based upon contextual information regarding the time, location, type of activity being performed, and/or any other suitable contextual information. Example user behaviors include eating meals, showering, looking for lost objects, driving to work, and the like. By tracking and storing information related to such interactions over time, patterns of interaction with detected objects may be observed. For example, it may be observed via the see-through display device 100 that every afternoon at five o'clock a user sets down keys, and looks for the keys every morning at eight o'clock.

Figure 2:
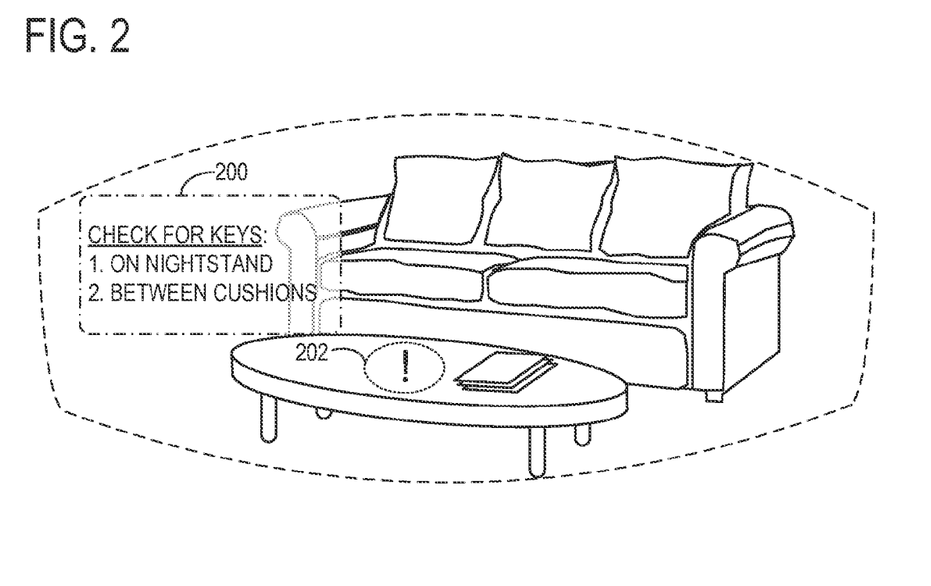
FIG. 2 shows another embodiment of a tracked object alert displayed on the see-through display device.

Alerts also may be generated based upon observed user patterns. For example, once a behavioral pattern related to user interactions with keys is recognized, a reminder regarding a location of the keys may be displayed automatically each morning at eight o'clock AM. Such patterns also may be used to formulate guesses as to where a lost object may be if the object has been moved since its location was last observed and stored via the see-through display device. An example of a displayed notice offering suggestions as to where to search for a lost object is shown in FIG. 2 in the form of a list 200 of locations at which to look for the object. FIG. 2 also shows a notice 202 regarding where the object was last seen. It will be understood that a notice regarding where to look for a lost object may take any form. For example, such a notice may take the form of graphical instructions that lead the user to the possible location(s), such as arrows and/or lines to follow, highlighting pointing out the suggested location to look, etc.

In some embodiments, a single view of a location may be generated based upon inputs of video data from multiple users, for example, where each user is uploading video data to a cloud-based service. This may allow objects seen in one user's video stream to be correlated with objects seen in another user's video stream, and therefore may allow objects to be tracked even when they are moved by other users. Further, object metadata may be shared across users so that multiple users can upload tracked object data instead of video data (e.g. such that multiple devices may perform local recognition for the same object).

As mentioned above, in addition to location, other states of objects may be understood and monitored. As non-limiting examples, a level of milk in a milk carton may be monitored. Likewise, a list of contents in a refrigerator may be monitored over time, and the absence of an item that is usually present may be noted. Based upon these observed states, alerts may be generated by a contextual trigger. For example, in the case of an observed empty milk carton, a visual overlay, an auto-generated shopping list, and/or a verbal reminder may be generated as the user walks by the milk section in the grocery store. The contextual trigger of being in the milk section of the grocery store may be understood in any suitable manner, including but not limited to by annotation or tagging of a particular type/brand of product by the grocery store or milk producer, by matching the appearance, size, and/or other physical and/or contextual characteristics of observed objects in the milk section with the characteristics of the tracked milk object, etc. Further, the fullness state of milk cartons may be adaptively learned as a tracked object state over time as the pattern of user shopping compared to the milk carton fullness state is observed over time (i.e. user consistently buys more milk when state of milk carton is empty or near empty).

Figure 3:
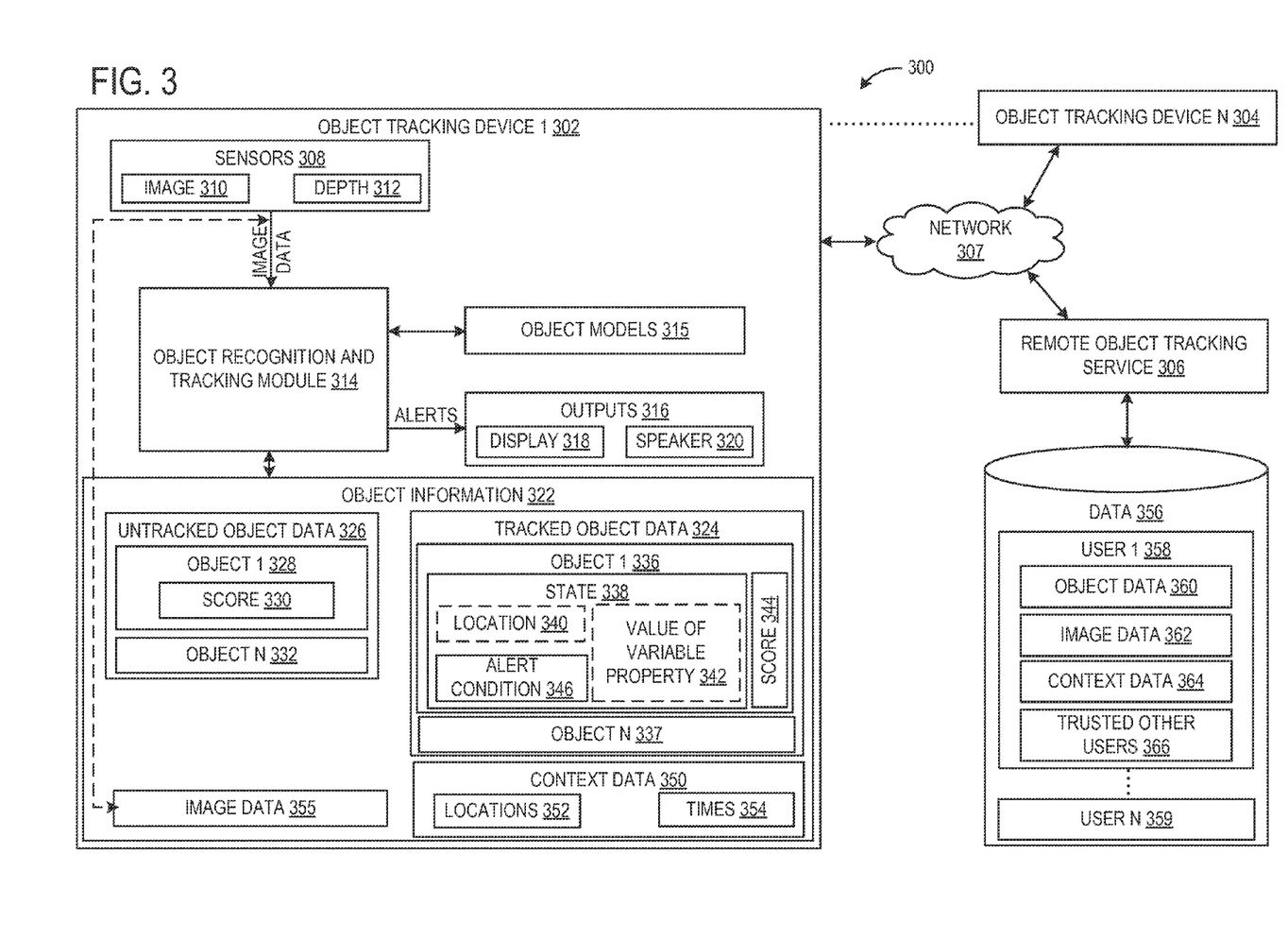
FIG. 3 shows a block diagram of an embodiment of a use environment for a see-through display device configured to track objects.

FIG. 3 shows a block diagram of a use environment 300 for the automated tracking of inanimate moveable objects. The use environment 300 shows an arbitrary number N of object tracking devices, illustrated as object tracking device 1 302 and object tracking device N 304, in communication with a remote object tracking service 306 via a network 307, such as a computer network. It will be understood that the object tracking devices may take any suitable form, including but not limited to the see-through display device 100 of FIG. 1. It will further be appreciated that some embodiments may omit a remote object tracking service.

The object tracking device 302 comprises one or more sensors 308. The sensors 308 may include image sensors, such as as two-dimensional image sensor(s) 310 and/or depth sensor(s) 312, which collect video data of a user's local environment. Any suitable type and number of two-dimensional image sensors 310 and/or depth sensors 312 may be included. Examples of suitable two-dimensional image sensors include RGB and grayscale sensors. Examples of suitable depth sensors include time-of-flight sensors, structured light sensors, and stereo depth sensors. It will be understood that any other suitable sensors may be included. Examples include, but are not limited to, microphones, global positioning system (GPS) sensors, motion sensors, inward-facing image sensors to detect eye motion, etc.

Image data collected via the image sensors is provided to an object recognition and tracking module 314, which identifies objects imaged by the image sensors, and detects state information regarding the objects. The object recognition and tracking module 314 further may provide alerts to one or more outputs 316, such as a display 318 (e.g. a see-through display, or any other suitable display) and/or one or more speakers 320, based upon object state, as described in more detail below. The object recognition and tracking module 314 may identify objects in any suitable manner, including but not limited to via classification functions pre-trained by a developer, and/or classification functions trained by a user to recognize user-specified objects, wherein the classification functions compare and/or fit the observed objects to object models 315. The object recognition and tracking module 314 may then output object identifications corresponding to the objects identified in the image data to an object information store 322. Further, where new objects are detected (i.e. objects that have not been previously detected), the object recognition and tracking module 314 may assign identifications to the objects.

The object information store 322 may be configured to store tracked object data 324, including but not limited to identity and state information for tracked objects. The object information store 322 also may store untracked object data 326 in embodiments that adaptively learn user patterns and automatically designate objects as tracked, wherein the term "untracked" indicates that state information is not stored for such objects. The untracked object data 326 is illustrated as storing information on a plurality of untracked objects, illustrated as object 1 328 and object N 332. Any suitable untracked object data may be stored. For example, importance score information 330 may be stored for each untracked object, wherein the importance score information 330 may be assigned to a recognized object based upon user interactions with the object and then used to determine whether to track the state of an object. When the importance score exceeds a threshold importance score, the object may be designed as a tracked object, and state information may be stored for the object.

The tracked object data 324 may include any suitable data stored for any suitable number and type of tracked objects. In FIG. 3, an plurality of tracked objects is indicated as tracked object 1 336 and tracked object N 337. Various state data 338 is also illustrated for tracked object 1. For example, location information 340, including but not limited to a most recent location and/or past locations, may be stored. Such location information also may comprise information regarding past user interactions with an object. This may allow for the analysis of user patterns to help locate lost objects, for example. Any suitable location information may be stored. Examples include information regarding a physical location of a current use environment (e.g. GPS coordinates) and/or contextual location data (e.g. location relative to other tracked/recognized objects).

Further, information regarding a value of a variable property 342 of the object may be stored. For example, as described above, an absence of a particular food item in a refrigerator, a level of milk in a milk carton, and/or any other suitable value related to a variable property of an object may be stored. It will be understood that these particular types of state information are described for the purpose of example, and that any other suitable state information may be stored.

Other information than state information also may be stored for an object. For example, in embodiments that adaptively learn and designate objects as tracked, importance score data 344 may be stored for tracked objects to determine whether to maintain a designation of an object as tracked. For example, if a user stops interacting with an object that is not lost, over time the score for that object may decrease, and the object may cease to be tracked. Further, alert conditions 346 also may be stored, wherein the alert conditions define when alerts are to be triggered for specified objects, as well as a nature of an alert to be provided.

Additionally, contextual data 350 may be stored as object information to help in the determination of an importance score for an object. For example, contextual data 350 may define locations 352, times 354, and/or other contextual information as "important" for the purpose of assigning an importance score to an object. Examples of locations 352 may include actual physical locations, contextual rules regarding proximity to other tracked objects, and other such location data. Examples of times 354 may include clock/calendar times, and/or contextual rules regarding time intervals between observed object interactions and other events, such as changes in location (e.g. time between interacting with an object and then leaving the house). The contextual data 350 further may comprise contextual rules regarding how to apply location, time, and other contextual information in determining importance scores for objects.

In some embodiments, the analysis of image data for objects may be performed at a later time, rather than in real time. As such, the object information store 322 may include image data 355 that has not been processed by the object recognition and tracking module 314. In such embodiments, image analysis may be performed when a user requests information about an object to locate the object in the image data by locating relevant image data in the stored image data 355. To assist with locating relevant image data, various metadata may be stored with the image data, such as a location (e.g. GPS data) and/or a time at which the image data was acquired.

In some embodiments, the object tracking and storage may be performed locally on the object tracking device 302. In other embodiments, as mentioned above, the object tracking device 302 may communicate with remote object tracking service 306 via a network. This may allow object data and image data to be shared between users. The remote object tracking service 306 may perform any of the object recognition, tracking, and alert generation functions described above with regard to the object tracking device 302. Further, information received from users may be stored in a user information store 356, which is illustrated as storing information for a plurality of users represented by user 1 358 and user N 359. Any suitable information may be stored, including but not limited to object data 360 (e.g. tracked and untracked object information), image data 362 (e.g. point cloud depth data and/or two-dimensional image data), and contextual data 364 (e.g. places/times/other contexts used for determining whether to track objects with which a user interacts). Further, the user data also may comprise information regarding trusted other users 366 with whom object data, image data, and/or other information may be shared. For example, a user may wish to access the image data of other family members to aid in the detection of lost objects. As a more specific example, if a user's spouse moves the user's keys from a table into a drawer, the spouse's object and/or image data may be searched along with the user's object and/or image data to help locate the keys.

Figure 4:
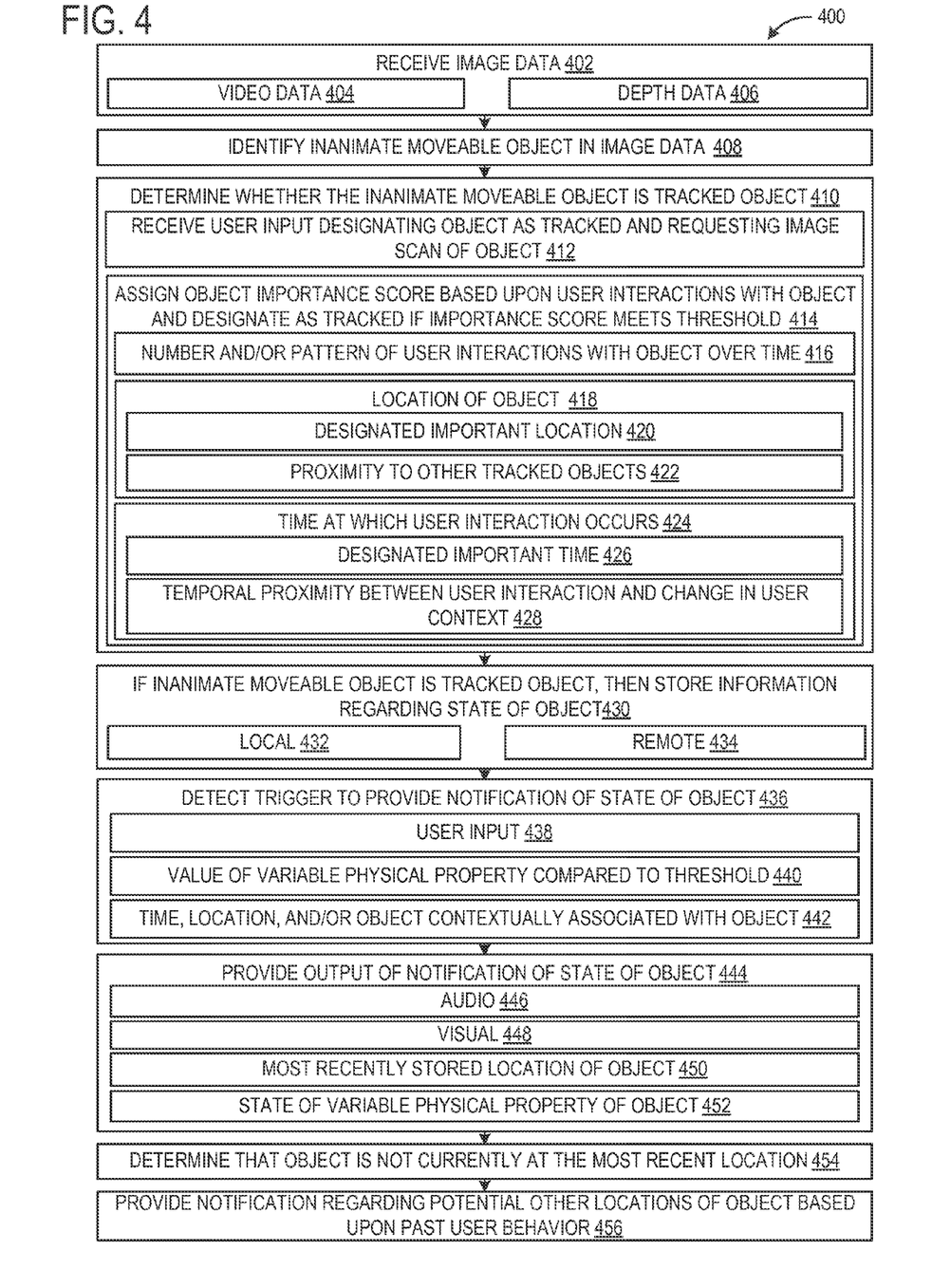
FIG. 4 shows a flow diagram depicting an embodiment for tracking objects via a see-through display device.

FIG. 4 shows a flow diagram depicting an embodiment of a method 400 for tracking objects via a see-through display device. Method 400 comprises, at 402, receiving image data of a background scene viewable through a see-through display system from an image sensor, wherein the term "background scene" denotes a field of view of a real-world scene located behind the see-through display relative to a user. Any suitable image data may be acquired, including but not limited to two-dimensional video data 404 (RGB and/or grayscale) and depth data 406.

Method 400 next comprises, at 408, identifying an inanimate moveable object in the image data, either in real time or at a later time upon receipt of a trigger (e.g. user request to locate an object, contextual trigger, etc.), and at 410, determining whether the detected inanimate moveable object is a tracked object. As described above, the inanimate moveable object may be identified in any suitable manner, including but not limited to via classification methods that compare the moveable object to object models.

Likewise, as described above, an inanimate moveable object may be defined as tracked in any suitable manner. For example, as indicated at 412, a user may request (via voice, gesture, and/or other suitable user input) that an object be designated as tracked, and scan an image of the object. Additionally, some objects may be designated as important by a developer and/or manufacturer of the see-through display device.

Further, as indicated at 414, an inanimate moveable object may be designated as tracked if a score ("importance score") that is assigned based upon user interactions with the object meets a threshold importance score. Any suitable factor or combination of factors may be used to determine such a score. For example, an importance score may be determined at least partially based upon a number, frequency, and/or pattern of user interactions with the object over time, as indicated at 416. Further, locational information also may be used in determining an importance score, as indicated at 418. Such locational information may include, but is not limited to, whether the object is in a location that is designated as important, as indicated at 420, and/or whether the object is in sufficiently close proximity to another tracked object, as indicated at 422.

Further, an importance score also may be assigned based at least partially upon a time at which a user interaction occurs, as indicated at 424. The time may comprise a designated important time 426, a temporal proximity between the user interaction with the object and a change in user context or other notable event, and/or any other suitable temporal factors. It will be understood that a location and/or a time may be designated as important in any suitable manner, including but not limited to by a user, by a developer and/or manufacturer, via adaptive learning, etc. It also will be understood that an importance score may be assigned in any other suitable manner. For example, in some embodiments, a user may assign an importance score to an object. In such embodiments, the user-assigned score may be assigned permanently, or may be an initial value that is later varied based upon user interactions with the object. Likewise, in other embodiments, an application may choose an importance score based upon any other suitable factors than location and/or time.

If the inanimate moveable object is determined to be a tracked object then method 400 comprises, at 430, storing information regarding the state of the object. Stored state information may include, but is not limited to, location information and/or information regarding a value of a variable physical property of the object. Further, he state information may be stored locally, as indicated at 432, and/or sent to a remote service for remote storage, as indicated at 434.

Method 400 next comprises, at 436, detecting a trigger to provide a output of notification of a state of a tracked object.

Any suitable trigger may be used. For example, as indicated at 438, the trigger may comprise a user input requesting information regarding the state of the object, such as a request to locate a lost object. Further, as indicated at 440, the trigger may comprise a detected value of a variable physical property of the object meeting a threshold condition. As yet another example, as indicated at 442, the trigger may comprise a detected time, location, and/or other object that is contextually associated with a tracked object. For example, detecting that a user is walking through a dairy section of a grocery store may trigger the output of a notification of a reminder to buy milk if an absence/low level of milk has previously been detected in the user's refrigerator. Likewise, where a user is at a location other than home, detecting a trigger may comprise detecting that a user has moved a predetermined distance from a personal item. As a more specific example, a trigger may be detected where a user sets down a wallet in a restaurant and then walks away from the table or outside of the building. It will be understood that the triggers described above are presented for the purpose of example, and are not intended to be limiting in any manner.

Upon detecting the trigger, method 400 comprises, at 444, providing an output of a notification of the slate of the object. Any suitable output may be provided, including audio 446 and/or visual outputs 448. Examples of suitable visual outputs include, but are not limited to, augmented reality imagery using a see-through display device, as described above with regard to FIG. 1. Further, information regarding the state may be obtained from local storage, or from a remote service. Where the information is obtained from a remote service, the information may be obtained from the user's account, another trusted user's account, as described above, or from any other suitable source.

The notification may comprise any suitable information. For example, as indicated at 450, the notification may inform a user of a most recently stored location of the object. As more specific examples, the notification may highlight a physical location of an object in a background scene, and/or may comprise directions (arrows, lines, text, etc.) that lead the user to a most recent location. A notification also may comprise an alert that a user has left the object behind in a public place. Further, the notification may comprise information regarding a detected value of a variable physical property of the object. For example, in the case where a milk carton meets a threshold state of emptiness, the notification may comprise a reminder to buy more milk, and/or an option to perform an online purchase of more milk.

Further, in some embodiments, a notification may include an image of the object being sought. This may help to locate an object in cases where similar looking variants of the object exist. For example, if a user is seeking a set of keys and a display device has information on four sets of keys that look similar, the display device may show images of the four sets of keys to allow the user to select the set being sought. Further, an image of a current setting of the object may be displayed. For example, if a set of keys being sought are currently on a nightstand, the display device may display an image of the keys on the nightstand to show the user the actual location of the keys.

In this manner, the states of objects may be tracked automatically for users, thereby facilitating the location of lost objects and/or the tracking of any other suitable object state. In some embodiments, the above described methods and processes may be tied to a computing system including one or more computers. In particular, the methods and processes described herein may be implemented as a computer application, computer service, computer API, computer library, and/or other computer program product.

Figure 5:
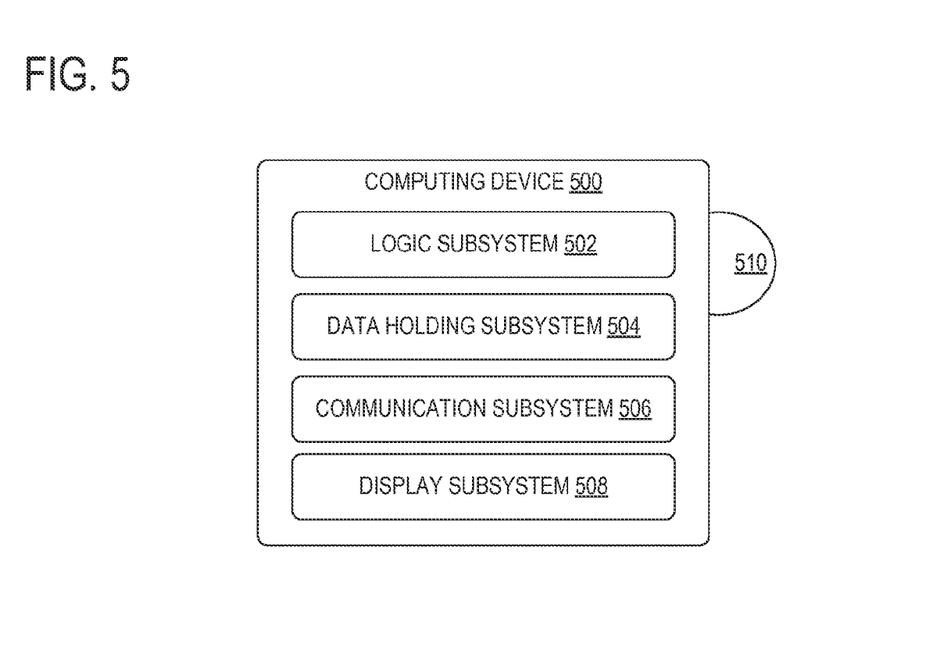
FIG. 5 shows a block diagram depicting an embodiment of a computing device.

FIG. 5 schematically shows a nonlimiting computing system 500 that may perform one or more of the above described methods and processes. Computing system 500 is shown in simplified form. It is to be understood that virtually any computer architecture may be used without departing from the scope of this disclosure. In different embodiments, computing system 500 may take the form of a mainframe computer, server computer, desktop computer, laptop computer, tablet computer, home entertainment computer, network computing device, mobile computing device, mobile communication device, see-through display device, near-eye display device, gaining device, etc., including but not limited to the see-through displays and other computing devices described herein with reference to FIGS. 1-4.

Computing system 500 includes a logic subsystem 502 and a data-holding subsystem 504. Computing system 500 may optionally include a display subsystem 508, communication subsystem 506, and/or other components not shown in FIG. 5. Computing system 500 may also optionally include user input devices such as keyboards, mice, game controllers, cameras, microphones, and/or touch screens, for example.

Logic subsystem 502 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 504 may include one or more physical, non-transitory, devices configured to hold data and/or instructions executable by the logic subsystem to implement the herein described methods and processes. When such methods and processes are implemented, the state of data-holding subsystem 504 may be transformed (e.g., to hold different data).

Data-holding subsystem 504 may include removable media and/or built-in devices. Data-holding subsystem 504 may include optical memory devices (e.g., CD, DVD HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 504 may include devices with one or more of the following characteristics: volatile, nonvolatile, dynamic, static, read/write, read-only, random access, sequential access, location addressable, file addressable, and content addressable. In some embodiment, logic subsystem 502 and data-holding subsystem 504 may be integrated into one or more common devices, such as an application specific integrated circuit or a system on a chip.

FIG. 5 also shows an aspect of the data-holding subsystem in the form of removable computer-readable storage media 510, which may be used to store and/or transfer data and/or instructions executable to implement the herein described methods and processes. Removable computer-readable storage media 510 may take the form of CDs, DVDs, HD-DVDs, Blu-Ray Discs, EEPROMs, and/or floppy disks, among others.

It is to be appreciated that data-holding, subsystem 504 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module" and "program" may be used to describe an aspect of computing system 500 that is implemented to perform one or more particular functions. In some cases, such a module and/or program may be instantiated via logic subsystem 502 executing instructions held by data-holding subsystem 504. It is to be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

Display subsystem 508 may be used to present a visual representation of data held by data-holding subsystem 504. As the herein described methods and processes change the data held by the data-holding subsystem, and thus transform the state of the data-holding subsystem, the state of display subsystem 508 may likewise be transformed to visually represent changes in the underlying data. Display subsystem 508 may include one or more display devices utilizing virtually any type of technology, including but not limited to see-through display technologies. Such display devices may be combined with logic subsystem 502 and/or data-holding subsystem 504 in a shared enclosure, or such display devices may be peripheral display devices.

When included, communication subsystem 506 may be configured to communicatively couple computing system 500 with one or more other computing devices. Communication subsystem 506 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 500 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of operating a mobile computing device, the mobile computing device comprising an image sensor, the method comprising:
   acquiring image data;
   identifying an inanimate moveable object in the image data;
   determining whether the inanimate moveable object is a tracked object based at least on previous user interactions with the inanimate moveable object;
   if the inanimate moveable object is a tracked object, then storing information regarding a state of the inanimate moveable object, the state including a most recent physical location of the object within a use environment;
   detecting a trigger to provide a notification of the state of the inanimate moveable object;
   providing an output of the notification of the state of the inanimate moveable object, the notification including instructions to guide a user to the stored most recent physical location of the object within the use environment; and
   when the object is no longer located at the stored most recent location, providing an output of one or more suggested current locations of the object.

2. The method of claim 1, further comprising determining whether the inanimate moveable object is a tracked object before storing information regarding the state of the inanimate moveable object.

3. The method of claim 2, further comprising receiving a user input assigning the inanimate moveable object as a tracked object and/or assigning a user-selected importance score to the inanimate moveable object.

4. The method of claim 2, further comprising assigning the inanimate moveable object an importance score based upon the previous user interactions with the inanimate moveable object, and designating the inanimate moveable object as a tracked object based upon the importance score meeting a threshold importance score.

5. The method of claim 4, wherein the importance score is assigned based at least partially upon a number of user interactions with the inanimate moveable object.

6. The method of claim 4, wherein the importance score is assigned based at least partially upon one or more of a location of the inanimate moveable object and a time at which a user interaction with the inanimate moveable object occurs.

7. The method of claim 6, wherein the importance score is assigned at least partially upon one or more of the location of the inanimate moveable object being designated as an important location, a proximity of the inanimate moveable object to other tracked objects, and a temporal proximity between a user interaction with the inanimate moveable object and a change in user context.

8. The method of claim 1, wherein the one or more suggested current locations of the object are based on historical locations of the object and/or user behavior.

9. The method of claim 1, wherein the state of the inanimate moveable object further comprises a value of a variable physical property of the inanimate moveable object, and wherein detecting the trigger further comprises detecting that the value of the variable physical property meets a threshold condition.

10. The method of claim 1, wherein detecting the trigger comprises detecting one or more of a time, a location, and an object contextually associated with the inanimate moveable object.

11. The method of claim 1, wherein detecting the trigger comprises receiving a user input requesting information regarding the state.

12. The method of claim 1, further comprising storing the information regarding the state by sending the information to a remote service via a network, and wherein the state includes GPS coordinates of a most recent physical location of the object within the use environment.

13. The method of claim 1, wherein the image data is acquired from one or more of an image sensor and a remote service, and wherein detecting the trigger to provide the notification of the state of the inanimate moveable object comprises detecting the trigger at a later time than a time at which the information regarding the state of the inanimate moveable object is stored.

14. A mobile computing device, comprising:
a sensor subsystem comprising an image sensor;
a display subsystem;
a logic subsystem configured to execute instructions; and
a data-holding subsystem comprising instructions stored thereon that are executable by the logic subsystem to:
receive image data from the image sensor;
detect via the image data a plurality of user interactions with a moveable inanimate physical object;
assign an importance score to the inanimate moveable physical object based upon the plurality of user interactions with the inanimate moveable physical object;
if the importance score meets a threshold importance score, then store information regarding a value of a variable physical property of the inanimate moveable physical object;
detect a trigger to provide a notification of the value of the variable physical property of the inanimate moveable physical object; and
provide an output of the notification of the value of the variable physical property of the inanimate moveable physical object.

15. The mobile computing device of claim 14, wherein the instructions are executable to detect the trigger by detecting that the value of the variable physical property meets a threshold condition.

16. The mobile computing device of claim 14, wherein the instructions are executable to detect the trigger by detecting a user input requesting information regarding the value of the variable physical property of the inanimate moveable physical object, wherein the mobile computing device is a head-mounted display device configured to be worn by a user, and wherein the image data is captured by the image sensor as the user moves about an environment.

* * * * *